(12) United States Patent
Choi

(10) Patent No.: US 8,736,911 B2
(45) Date of Patent: May 27, 2014

(54) IMAGE READER AND IMAGE FORMING APPARATUS INCLUDING A BOTTOM WALL HAVING A CONVEX PORTION PROTRUDING TOWARD THE OUTSIDE OF THE HOUSING

(75) Inventor: Yong Ho Choi, Incheon (KR)

(73) Assignee: Fuji Xerox Co., Ltd., Tokyo (JP)

( * ) Notice: Subject to any disclaimer, the term of this patent is extended or adjusted under 35 U.S.C. 154(b) by 882 days.

(21) Appl. No.: 12/831,720

(22) Filed: Jul. 7, 2010

(65) Prior Publication Data

US 2011/0058227 A1 Mar. 10, 2011

(30) Foreign Application Priority Data

Sep. 4, 2009 (JP) ................................. 2009-204836

(51) Int. Cl.
*H04N 1/00* (2006.01)
(52) U.S. Cl.
USPC ............ 358/401; 358/498; 399/125; 399/405
(58) Field of Classification Search
CPC ............ H04N 5/2253; H04N 1/00533; H04N 1/00559; H04N 1/0314; H04N 1/0452
USPC .................................................. 399/91–126
See application file for complete search history.

(56) References Cited

U.S. PATENT DOCUMENTS

2006/0088336 A1* 4/2006 Hirose et al. .................. 399/110
2008/0137158 A1 6/2008 Sawada et al.

FOREIGN PATENT DOCUMENTS

JP A-2008-135986 6/2008

* cited by examiner

*Primary Examiner* — Benny Q Tieu
*Assistant Examiner* — Marcellus Augustin
(74) *Attorney, Agent, or Firm* — Oliff PLC

(57) ABSTRACT

An image reader includes: a bottom wall that faces a discharge table of a main body of an image forming apparatus, to which a printed sheet is discharged, with a space formed therebetween, the bottom wall forming a bottom surface of a housing that receives an optical system and including a concave portion recessed into the inside of the housing without including a convex portion protruding toward the outside of the housing in a contactable area having a possibility that the printed sheet comes into contact therewith when the printed sheet is discharged to the discharge table, the bottom wall including the convex portion protruding toward the outside of the housing in the other areas except for the contactable area.

1 Claim, 4 Drawing Sheets

IMAGE READER AND IMAGE FORMING APPARATUS INCLUDING A BOTTOM WALL HAVING A CONVEX PORTION PROTRUDING TOWARD THE OUTSIDE OF THE HOUSING

CROSS-REFERENCE TO RELATED APPLICATIONS

This application is based on and claims priority under 35 USC 119 from Japanese Patent Application No. 2009-204836 filed Sep. 4, 2009.

BACKGROUND

1. Technical Field

The invention relates to an image reader and an image forming apparatus.

2. Related Art

SUMMARY

According to an aspect of the invention, there is provided an image reader including: a bottom wall that faces a discharge table of a main body of an image forming apparatus, to which a printed sheet is discharged, with a space formed therebetween, the bottom wall forming a bottom surface of a housing that receives an optical system and including a concave portion recessed into the inside of the housing without including a convex portion protruding toward the outside of the housing in a contactable area having a possibility that the printed sheet comes into contact therewith when the printed sheet is discharged to the discharge table, the bottom wall including the convex portion protruding toward the outside of the housing in the other areas except for the contactable area.

BRIEF DESCRIPTION OF THE DRAWINGS

Exemplary embodiments of the present invention will be described in detail based on the following figures, wherein.

DETAILED DESCRIPTION

Figure 1:
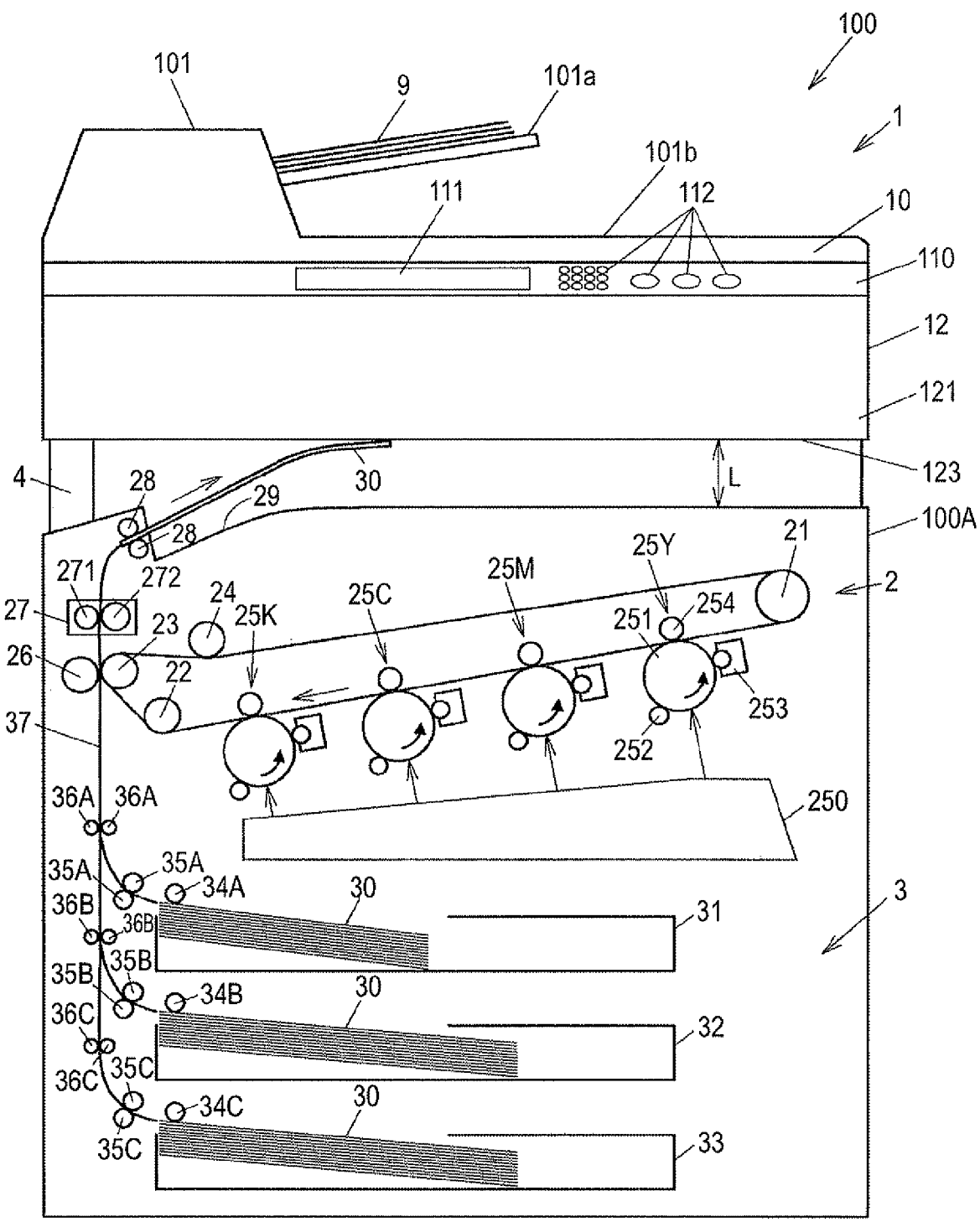
FIG. 1 is a view showing an example of the structure of an image forming apparatus according to an exemplary embodiment of the invention.

FIG. 1 shows an image forming apparatus according to an exemplary embodiment of the invention. FIG. 1 shows the appearance of an image reader 1 and the internal structure of a main body portion 100A that is disposed below the image reader 1.

(The Entire Structure of Image Forming Apparatus)

The image forming apparatus 100 includes the image reader 1 that reads images from a document 9, an image forming section 2 that prints images on a sheet 30, and a tray section 3 that feeds the sheet 30 to the image forming section 2. The image reader 1 is supported above the main body portion 100A as a main body of the image forming apparatus by a supporting portion 4 so that a space to which the printed sheet 30 is discharged is formed between the image reader and the main body portion 100A housing the image forming section 2 and the tray section 3.

A touch panel 111, which provides operation menus to a user and receives various settings, and a control panel 110 including plural operation buttons 112 are provided on a front wall 121 that corresponds to a front surface of a housing 12 of the image reader 1. Further, a document cover 10, which can be opened and closed relative to the housing 12, is disposed on the control panel 110.

The image forming section 2 includes an intermediate transfer belt 20; first to fourth image forming units 25Y, 25M, 25C, and 25K that transfer yellow (Y), magenta (M), cyan (C), and black (K) toner images to the intermediate transfer belt 20; and an optical scanning device 250 that irradiates the first to fourth image forming units 25Y, 25M, 25C, and 25K with laser light modulated on the basis of image information.

The first image forming unit 25Y includes a photoconductive drum 251, a charger 252, a developing unit 253, and a primary transfer roller 254. The charger 252 uniformly charges the surface of the photoconductive drum 251. The developing unit 253 forms a toner image by developing an electrostatic latent image, which is formed on the surface of the photoconductive drum 251 by the optical scanning device 250 with toner. The primary transfer roller 254 presses the intermediate transfer belt 20 against the photoconductive drum 251. Each of the second to fourth image forming units 25M, 25C, and 25K also has the same structure as that of the first image forming unit 25Y.

The intermediate transfer belt 20 is driven by a driving roller 21 connected to a motor (not shown), and is rotated along a circulation path that is formed by first and second driven rollers 22 and 23 and a tension roller 24 applying tension to the intermediate transfer belt 20.

Further, the image forming section 2 includes a secondary transfer roller 26, a fixing unit 27, and discharge rollers 28. The secondary transfer roller 26 is disposed at a position that faces the second driven roller 23 with the intermediate transfer belt 20 interposed therebetween. The fixing unit 27 includes a fixing roller 271 having a heater therein, and a pressing roller 272 that is pressed against the fixing roller 271. The discharge rollers 28 discharge the sheet 30, which has passed through the fixing unit 27, to a discharge table 29.

The tray section 3 includes first to third trays 31 to 33 that are disposed parallel to each other in a vertical direction. The sheets 30, which have different orientations, sizes, or materials, are stored in the respective first to third trays.

Further, the tray section 3 includes pickup rollers 34A, 34B, and 34C; separation rollers 35A, 35B, and 35C; and registration rollers 36A, 36B, and 36C so as to correspond to the first to third trays 31 to 33, respectively. Each of the pickup rollers 34A, 34B, and 34C picks up the stored sheet 30. When plural sheets 30 are picked up, each of the separation rollers 35A, 35B, and 35C separates the sheets. Each of the registration rollers 36A, 36B, and 36C transports the sheet 30 to the downstream side. The registration rollers 36A, 36B, and 36C are operated in synchronization with the timing of the image formation that is performed by the image forming section 2, and guide the sheets 30, which are picked up from the first to third trays 31 to 33, to a gap between the secondary transfer roller 26 and the intermediate transfer belt 20 along a transport path 37.

The image forming apparatus 100 is adapted as follows: when the sheets 30 having different sizes or orientations are stored in the respective trays 31 to 33, the sheet 30 fed from each of the trays 31 to 33 is transported so that the middle of the sheet 30 corresponds to the middle of the transport path 37, and is discharged onto the discharge table 29 from the discharge rollers 28.

(Structure of Image Reader)

Figure 2:
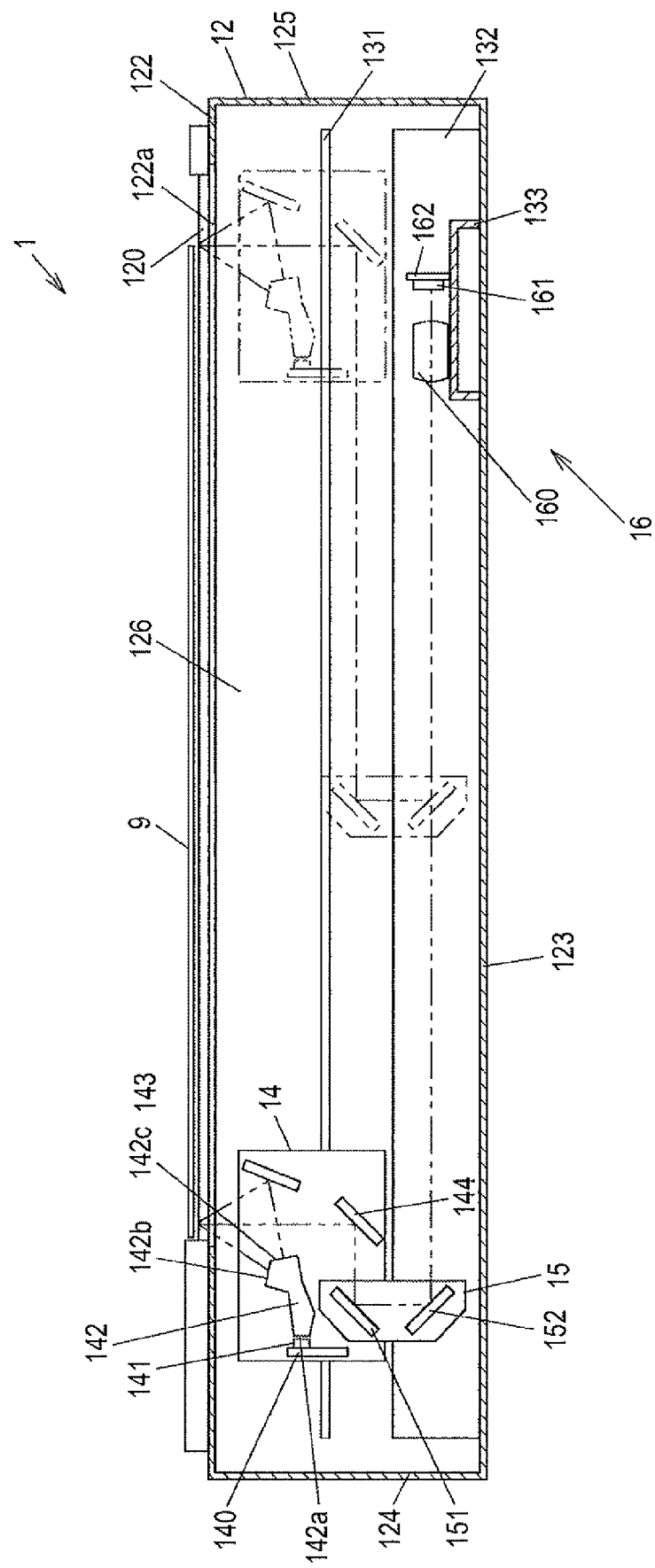
FIG. 2 is a schematic view showing the internal structure of an image reader 1.

FIG. 2 is a schematic view showing the internal structure of the image reader 1. Meanwhile, the document cover 10 is omitted in FIG. 2. The image reader 1 includes first and second carriages 14 and 15 and an image reading unit 16 in the housing 12. The first and second carriages 14 and 15 can move in a sub-scanning direction. The image reading unit 16 includes a lens 160, a CCD (Charge Coupled Device) 161, and the like.

The housing 12 is formed in the shape of a box of which a part of an upper wall 122 facing the document cover 10 is opened. The housing 12 includes a bottom wall 123 that faces the upper wall 122, side walls 124 and 125 that face each other in a sub-scanning direction (a horizontal direction in FIG. 2) with the bottom wall 123 interposed therebetween, the above-mentioned front wall 121 (see FIG. 1), and a rear wall 126 that faces the front wall 121 in a main scanning direction (a direction perpendicular to the plane of FIG. 2). An opening portion 122a of the upper wall 122 is covered with a platen glass 120 on which the document 9 is placed.

First rails 131, which extend in the sub-scanning direction, are fixed to the rear wall 126. Further, second rails 132, which extend in the sub-scanning direction, are fixed to the bottom wall 123. Two first rails 131 and two second rails 132 are disposed parallel to each other in the main scanning direction, but only one of each of the rails is shown in FIG. 2.

A substrate 140, plural LEDs 141, a light guide body 142, a reflector 143, and a first mirror 144 are fixed to the first carriage 14. The substrate 140 extends in the main scanning direction. The LEDs 141 are mounted on the substrate 140, and emit light that is used to irradiate the document 9. The light guide body 142 is disposed parallel to the substrate 140. The reflector 143 reflects a part of the light, which is emitted from the light guide body 142, toward the document 9. The first mirror 144 receives the light reflected from the document 9.

Further, the first carriage 14 is guided by the first rails 131, irradiates a portion of the document 9 where an image is read while moving in the sub-scanning direction together with members such as the light guide body 142, and reflects the light, which is reflected from the document 9, by the first mirror 144 toward a second mirror 151 of the second carriage 15 to be described below.

The light guide body 142 is made of an optically transparent material such as an acrylic material. The light guide body includes an incident surface 142a, a first emission surface 142b, and a second emission surface 142c. The incident surface 142a faces the LEDs 141. The first emission surface 142b emits a part of the light, which enters from the incident surface 142a, toward the document 9. The second emission surface 142c emits the other part of the light, which enters from the incident surface, toward the reflector 143.

The second mirror 151 and a third mirror 152 are fixed to the second carriage 15. The second mirror 151 receives the light reflected from the above-mentioned first mirror 144, and the third mirror 152 receives the light reflected from the second mirror 151.

Further, the second carriage 15 is guided by the second rails 132, and reflects the light, which is reflected from the document 9, toward the lens 160 of the image reading unit 16 while moving in the sub-scanning direction.

The first and second carriages 14 and 15 are driven by a drive mechanism (not shown), and the moving distance of the second carriage 15 is equal to the half of the moving distance of the first carriage 14 so that the length of an optical path between the CCD 161 to be described below and the portion of the document 9 where an image is read is not changed, while the first carriage 14 moves in the sub-scanning direction. The first and second carriages 14 and 15, when the first carriage 14 is moved near the end of the document 9 in the sub-scanning direction, are shown in FIG. 2 by a two-dot chain line.

The image reading unit 16 includes the lens 160 that is fixed to a base plate 133 supported by the second rails 132, and a substrate 162 on which the CCD (Charge Coupled Device) 161 is mounted.

Further, the image reading unit 16 is formed so that the light reflected from the third mirror 152 is transmitted through the lens 160 and forms an image on the CCD 161 and the image of the document 9 is read by the CCD 161.

(Shape of Bottom of Image Reader)

Figure 3:
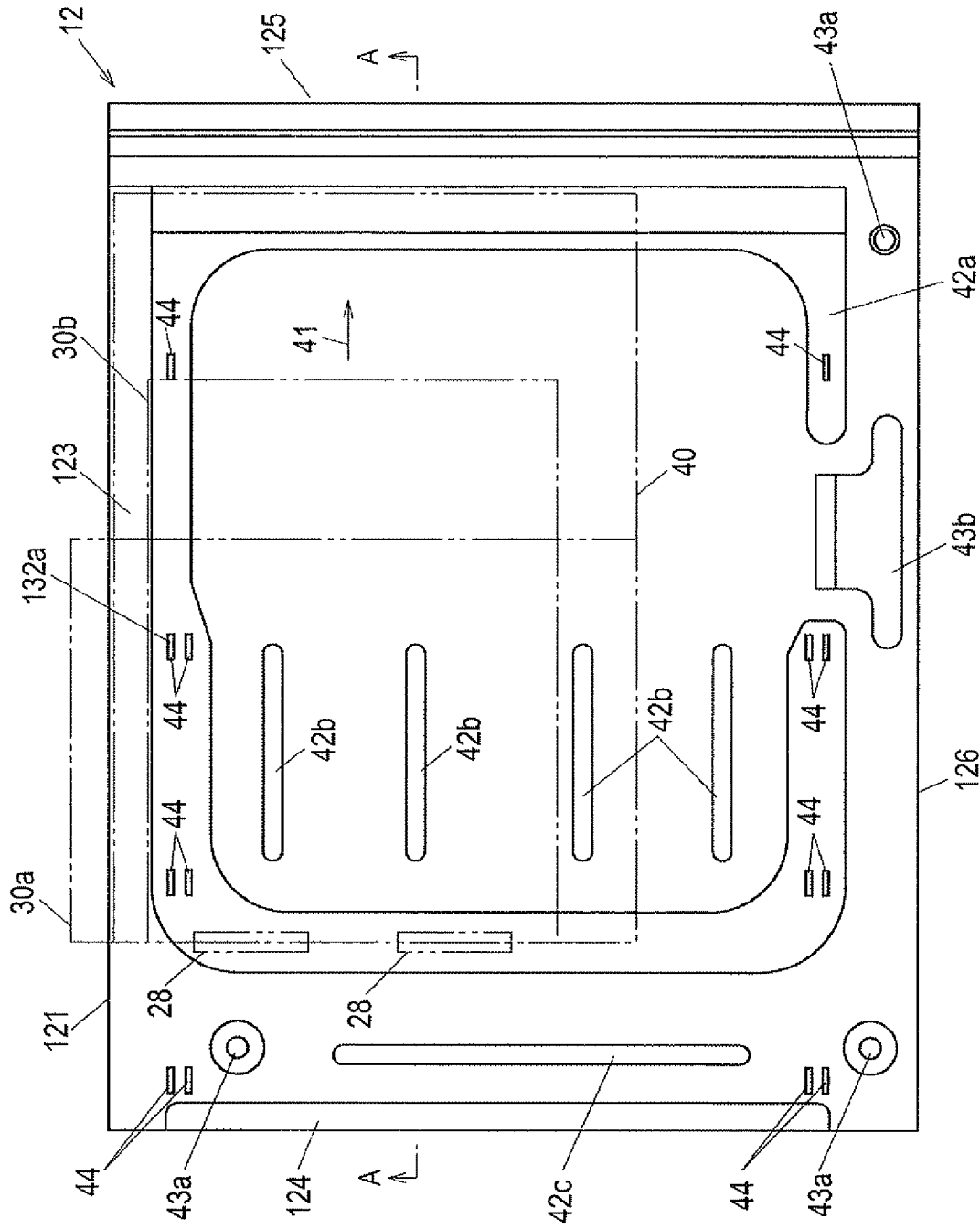
FIG. 3 is a bottom view of a housing of the image reader.
Figure 4:
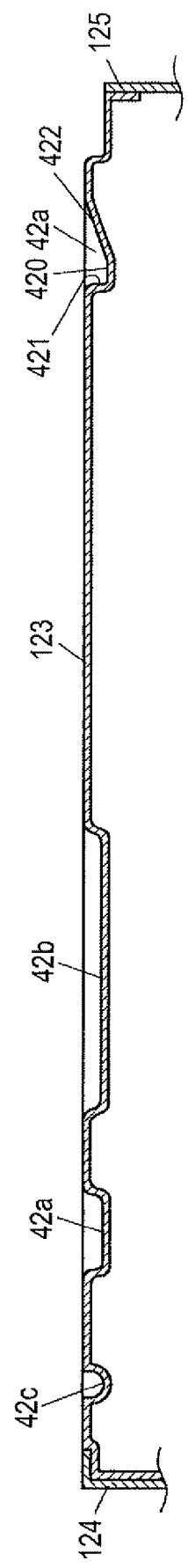
FIG. 4 is a cross-sectional view taken along a line A-A of FIG. 3.

FIG. 3 is a bottom view of the housing 12 of the image reader 1, and FIG. 4 is a cross-sectional view taken along a line A-A of FIG. 3.

If the height of the image forming apparatus 100 is set to be low in consideration of the operability of the control panel 110 or the number of trays 3 is increased so that many kinds of sheets 30 can be stored, a distance L (see FIG. 1) between the discharge table 29 and the image reader 1 is relatively small. In this case, when the printed sheet 30 is discharged onto the discharge table 29, as shown in FIG. 1, there is a possibility that the sheet 30 comes into contact with the bottom wall 123 of the housing 12 of the image reader 1. Hereinafter, an area 40 where the sheet 30 may come into contact is referred to as a "contactable area". Meanwhile, the contactable area 40 may be provided on the bottom wall 123 due to a reason other than the above-mentioned reason. If the image forming apparatus 100 has a double-side printing function, the printed sheet 30 of which only one surface is printed in a double-side printing mode is also included in the printed sheet. In the double-side printing mode, the printed sheet 30 of which one surface is printed is exposed to the discharge table 29 once and is taken into the main body portion 100A again. Then, the other surface of the sheet 30 is printed in the image forming section 2.

Further, the bottom wall 123 may be formed of a plate-like material, such as a metal plate (which is made of steel, aluminum, or the like) or a resin plate (which is made of polyethylene or the like). In this exemplary embodiment, a steel plate having a thickness of about 1 to 2 mm is used as the material of the bottom wall 123, and drawing is performed at portions of the bottom wall 123 in order to increase stiffness.

That is, a first concave portion 42a, plural second concave portions 42b, a third concave portion 42c, first convex portions 43a, and a second convex portion 43b are formed on the bottom wall 123 of the housing 12 by drawing. The first concave portion 42a protrudes toward the inside of the housing 12 and has a first width at a substantially annular area, for example, a substantially C-shaped area. The plural second concave portions 42b are formed inside the first concave portion 42a, have a second width smaller than the first width at linear areas along a sheet discharge direction 41, and protrude toward the inside of the housing 12. The third concave portion 42c is formed outside the first concave portion 42a, has the second width at a linear area along a direction orthogonal to the sheet discharge direction 41, and protrudes toward the inside of the housing 12. The first convex portions 43a are formed at corners of the bottom wall 123 and function as three seats protruding toward the outside of the housing 12. The second convex portion 43b is formed near a C-shaped gap of the first concave portion 42a and protrudes toward the outside of the housing 12. Meanwhile, the substantially annular area where the first concave portion 42a is formed is not limited to the substantially C-shaped area, and includes a substantially U-shaped area, a substantially annular area of which a part is broken, and a completely annular area without a broken portion. Further, the substantially annular area may be divided into plural areas.

Further, as shown in FIG. 4, a downstream portion of the first concave portion 42a in the sheet discharge direction 41 includes a bottom surface 420, a side surface 421 that is substantially perpendicular to the bottom surface 420, and an inclined surface 422 that is inclined with respect to the side surface 421. Furthermore, an upstream portion of the first concave portion in the sheet discharge direction includes the bottom surface 420 and a pair of the side surfaces 421. Accordingly, even though the front end of the printed sheet 30 comes into contact with the inclined surface 422, the front end portion of the sheet 30 is not bent and the sheet is smoothly discharged.

As shown in FIG. 3, plural openings 44 to which protruding pieces 132a of the second rails 132 are inserted and welded are formed at the bottom wall 123 in the sub-scanning direction. The protruding pieces 132a, which are inserted into the openings 44 formed at the first concave portion 42a, are formed to hardly protrude from the bottom surface 420 of the first concave portion 42a. The protruding pieces 132a, which are inserted into the openings 44 formed at the other portions except for the first concave portion 42a, are formed to hardly protrude from the surface of the bottom wall where the concave portions 42a to 42c and the convex portions 43a and 43b are not formed.

If the concave portions 42a to 42c and the convex portions 43a and 43b are formed at the bottom wall 123 of the housing 12, the stiffness of the bottom wall is increased as compared to when either the concave portions or the convex portions are formed. As a result, high strength is obtained.

(Operation of Image Forming Apparatus)

The operation of the image forming apparatus 100 will be described below. When a user places the document 9 on a sheet feed tray 101a or the platen glass 120 and instructs the image forming apparatus to copy the document 9 by operating the operation buttons 112 and the touch panel 111 of the control panel 110, the image reader 1 begins to read images. If the document 9 is placed on the sheet feed tray 101a, the controller (not shown) of the image reader 1 controls an automatic sheet feeder 101 so that the document 9 is transported to a read position on the platen glass 120.

The controller of the image reader 1 supplies current to the plural LEDs 141 so that the LEDs emit light. Further, the controller controls the drive mechanism so that the first and second carriages 14 and 15 are driven in the sub-scanning direction. The light, which is emitted from the emission surface 142c of the light guide body 142 and is reflected from the surface of the document 9, is reflected by the first mirror 144, the second mirror 151, and the third mirror 152 and enters the lens 160 of the image reading unit 16.

The light transmitted through the lens 160 forms an image on the CCD 161, and the image of the document 9 is read by the CCD 161. The controller of the image reader 1 sends image data as the result of the reading of the image to the optical scanning device 250 of the image forming section 2. After that, if the document 9 placed on the sheet feed tray 101a has been read, the controller controls the automatic sheet feeder 101 so that the document 9 is discharged to a discharge table 101b.

The optical scanning device 250 forms electrostatic latent images on the surfaces of the photoconductive drums 251 by irradiating the photoconductive drums 251, which are charged by the chargers 252, with the light beam that is modulated on the basis of the data of yellow, magenta, cyan, and black images. The electrostatic latent images are developed with toner by the developing units 253, so that toner images are formed. The toner images formed on the photoconductive drums 251 are transferred to the intermediate transfer belt 20 by the primary transfer rollers 254.

Meanwhile, the sheet 30 is taken onto the sheet transport path 37 from one of the first to third trays 31 to 33, for example, the first tray 31 by the pickup roller 34A and is separated by the separation roller 35A. Then, the sheet 30 is transported to a gap between the secondary transfer roller 26 and the intermediate transfer belt 20 by the registration rollers 36A, and the toner images transferred to the intermediate transfer belt 20 are transferred to the sheet 30.

After that, the toner images transferred to the sheet 30 are fixed by the fixing unit 27 and the sheet is discharged onto the discharge table 29 by the discharge rollers 28.

If an A4 sheet (A4L) 30a, which is disposed so that the longitudinal direction of the sheet 30a corresponds to the main scanning direction, is selected, the sheet 30a is discharged in the sheet discharge direction 41 while a part of the sheet 30a is deviated from the bottom wall 123 to the outside as shown by an imaginary line of FIG. 3. In this case, even though coming into contact with the bottom wall 123, the sheet 30a comes into contact with the bottom wall within the contactable area 40. If an A4 sheet (A4S) 30b, which is disposed so that the longitudinal direction of the sheet 30b corresponds to the sub-scanning direction, is selected, the sheet 30b is discharged in the sheet discharge direction 41 as shown by an imaginary line of FIG. 3. In this case, even though coming into contact with the bottom wall 123, the sheet 30b comes into contact with the bottom wall within the contactable area 40. Even though the sheets 30 (30a and 30b) come into contact with the bottom wall within the contactable area 40, the sheets 30 are smoothly discharged onto the discharge table 29 without being bent.

Meanwhile, the invention is not limited to the above-mentioned exemplary embodiment, and may have various modifications without departing from the scope of the invention. For example, when the sheet 30 is transported along the transport path 37, the sheet may be transported while one side of the sheet 30 along a transport direction of the sheet is used as reference. In this case, when being discharged onto the discharge table 29, the printed sheet is discharged so as to substantially correspond to one side of the contactable area 40 along the sheet discharge direction 41 regardless of the direction or size of the sheet 30. Further, the bottom wall 123 of the image reader 1 may be formed of a resin plate. In this case, the concave portions and the convex portions are formed by injection molding or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An image forming apparatus comprising:
   an image reader; and
   a main body of the image forming apparatus, wherein the image reader includes a bottom wall that faces a discharge table of the main body of the image forming apparatus, to which a printed sheet is discharged, with a space formed therebetween, the bottom wall forming a bottom surface of a housing that receives an optical system and including a concave portion recessed into the inside of the housing in a contactable area directly above the printed sheet discharge table, the printed sheet possibly contacting the contactable area during a discharge process, the bottom wall including the convex portion protruding toward the outside of the housing in other areas except for the contactable area.

* * * * *